United States Patent [19]

Gunnewig et al.

[11] Patent Number: 4,805,659

[45] Date of Patent: Feb. 21, 1989

[54] METHOD OF DRIVING A CENTRIFUGE AND DEVICE FOR CARRYING OUT THE METHOD

[75] Inventors: Hubert Gunnewig, Oelde; Ulrich Wrede, Ennigerloh-Ostenfelde, both of Fed. Rep. of Germany

[73] Assignee: Westfalia Separator AG, Oelde, Fed. Rep. of Germany

[21] Appl. No.: 32,886

[22] Filed: Mar. 31, 1987

[30] Foreign Application Priority Data

Apr. 10, 1986 [DE] Fed. Rep. of Germany ....... 3612063

[51] Int. Cl.[4] .............................................. F16K 11/07

[52] U.S. Cl. ....................................... 137/118; 73/57; 137/117; 137/467.5; 137/599

[58] Field of Search ................... 137/93, 118, 117, 92, 137/533.31, 467.5, 504, 110, 599; 73/57, 61 R, 861.55, 861.57

[56] References Cited

U.S. PATENT DOCUMENTS

| | | | |
|---|---|---|---|
| 1,123,124 | 12/1914 | Harcourt | 137/467.5 |
| 2,011,812 | 8/1935 | Hatcher et al. | 137/533.31 X |
| 2,311,375 | 2/1943 | Farwick | 73/861.57 |
| 2,348,732 | 5/1944 | Fischer | 73/861.57 X |
| 2,532,792 | 12/1950 | Svensjo | 137/93 X |
| 3,023,591 | 3/1962 | Tilney | 137/504 X |
| 3,024,654 | 3/1962 | Head | 73/861.57 |
| 3,277,916 | 10/1966 | Deming | 137/92 X |
| 3,779,266 | 12/1973 | Fruth et al. | 137/110 |
| 3,918,481 | 11/1975 | Doe et al. | 137/504 |
| 4,054,155 | 10/1977 | Hill | 137/625.48 |
| 4,243,064 | 1/1981 | Nolte | 137/117 |
| 4,638,831 | 1/1987 | Lindgren | 137/117 |

FOREIGN PATENT DOCUMENTS

| | | | |
|---|---|---|---|
| 331933 | 8/1958 | Switzerland | 137/118 |
| 2114715 | 8/1983 | United Kingdom | 137/543 |

*Primary Examiner*—Stephen Hepperle
*Attorney, Agent, or Firm*—Sprung Horn Kramer & Woods

[57] ABSTRACT

In centrifuges that concentrate liquids that contain suspended solids and wherein the concentrated solids are removed from the centrifuge at a constant rate, the concentration of solids leaving the centrifuge must be regulated. Some of the concentrated solids leaving the centrifuge for example can for this purpose be returned to the centrifuge. In the method in accordance with the invention, the solids leaving the centrifuge through its second outlet are diverted through a measuring channel that contains a bob. The shape of the bob ensures that the force exerted on it by the solids will increase with the viscosity of the solids. The force can accordingly be exploited to adjust a flow regulator in such a way that amount of solids returned to the centrifuge is decreased.

6 Claims, 2 Drawing Sheets

METHOD OF DRIVING A CENTRIFUGE AND DEVICE FOR CARRYING OUT THE METHOD

BACKGROUND OF THE INVENTION

The present invention relates to a method and to a device for driving a centrifuge with a line supplying a liquid that contains a suspension of solids, an outlet for the clarified liquid, and another outlet for the concentrated solids, whereby the concentration of the solids, which leave the second outlet at a constant output, is regulated as a function of their viscosity by returning some of them to the centrifuge through an adjustable flow regulator.

A method of this type is known, from U.S. Pat. No. 2,532,792 for example. A rotating body that turns at a constant speed is positioned in a measuring channel. As the viscosity of the solids flowing through the channel increases, the torque needed to turn the rotor also increases. The increase in torque is exploited to adjust a flow regulator in such a way as to decrease the volume of solids returned to the centrifuge. Since generating and processing the torque is very expensive from the aspects of design and controls technology, the known process is often too costly to be practical.

SUMMARY OF THE INVENTION

The object of the present invention is to essentially decrease the design and controls-technology costs of the generic method.

This object is attained in the method in accordance with the invention by the improvement wherein the concentrated solids are conveyed through a measuring channel that accommodates a flow-sensitive flow body, which is shaped in such a way that the force exerted on it by the solids increases with their viscosity, and the increase is exploited to adjust a flow regulator in such a way as to decrease the volume of solids returned to the centrifuge.

A flow body that reacts to the force generated by the solids flowing through the measuring channel can be employed instead of a rotor with its aforesaid drawbacks, and a force differential is easier to convert than a torque differential from the aspect of controls technology.

The force exerted on the flow body in one particularly simple embodiment of the invention can be directly exploited to adjust the flow regulator.

The force exerted on the flow body can on the other hand also be measured, and a control signal derived therefrom exploited to adjust the flow regulator.

The force exerted on the flow body can, in another practical embodiment, be utilized to shift the position of the bob, and a signal derived from the particular position of the bob exploited to adjust the flow regulator.

The object is also attained in a device for carrying out the method in accordance with the invention wherein the flow body can be shaped like a cylindrical cone and the measuring channel associated with it is also shaped like a cylindrical cone and oriented upright such that the gap between the outside diameter of the bob and the inside diameter of the channel will increase when the bob moves in the direction of flow, which is opposed to the force of gravity.

The flow body in this embodiment will assume a position inside the measuring channel in which the forces acting on it are in equilibrium. These forces consist on the one hand of the downward force deriving from the weight of the flow body and on the other of the lift, jet pressure, and fluid friction that move it upward. At constant flow and constant specific gravity, an increase in the viscosity of the medium flowing through the measuring channel will increase the fluid friction and hence the upward forces. The flow body will accordingly move up inside the channel, increasing the gap between the outside diameter of the flow body and the inside diameter of the channel. The rate of flow through the channel will accordingly be decreased and the jet pressure reduced until the forces acting on the flow body are in equilibrium again. The stroke traveled by the flow body can be exploited directly or indirectly to adjust the flow regulator.

The flow body 110 can, however, also be shaped like a cylinder and can be tightly surrounded by a cylindrical measuring channel, whereby the flow body will be provided with a number of axial channels. The solids in this embodiment flow through the channels in the flow body, exerting increasing force as their viscosity increases. This force can also be exploited directly or indirectly to adjust the flow regulator.

The flow regulator can be directly adjusted in a practical way by means of a rod that connects the flow body to a valve piston in the flow regulator.

The measuring channel and the flow regulator in one practical embodiment of the device share a common housing. The result is an especially simple device for carrying out the method.

The piston can, as the flow body moves in the direction of flow, reduce the cross-section of a constriction in the passage for the returning concentrate and expand the cross-section of a constriction in the passage for the concentrate leaving the centrifuge.

The flow body can move in the direction of flow against the force of a spring that acts on the flow body. The force exerted on the flow body by the spring can be adjusted with a setscrew.

The flow body can be connected to an inductive sensor or to a pressure sensor.

A channel can extend from the intake of the device into the measuring channel and another channel into a line for the solids leaving the centrifuge and chokes can be positioned in the channels.

Some preferred embodiments of the invention will now be specified with reference to the attached drawings, wherein:

DETAILED DESCRIPTION OF THE PREFERRED EMBODIMENTS

Figure 1:
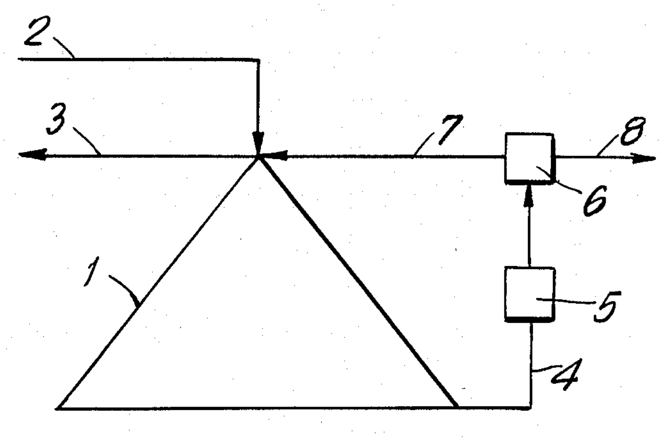
FIG. 1 is a schematic diagram of the method according to the invention.

The centrifuge 1 illustrated in FIG. 1 has a line 2 for supplying a liquid containing a suspension of solids, an outlet 3 for the clarified liquid, and another outlet 4 for the concentrated solids. Accommodated in second outlet 4 are a measuring channel 5 and a flow regulator 6. The stream of solids leaving second outlet 4 is divided into a solids phase that is returned to centrifuge 1 through a line 7 and another solids phase that is removed from the system through another line 8.

Figure 2:
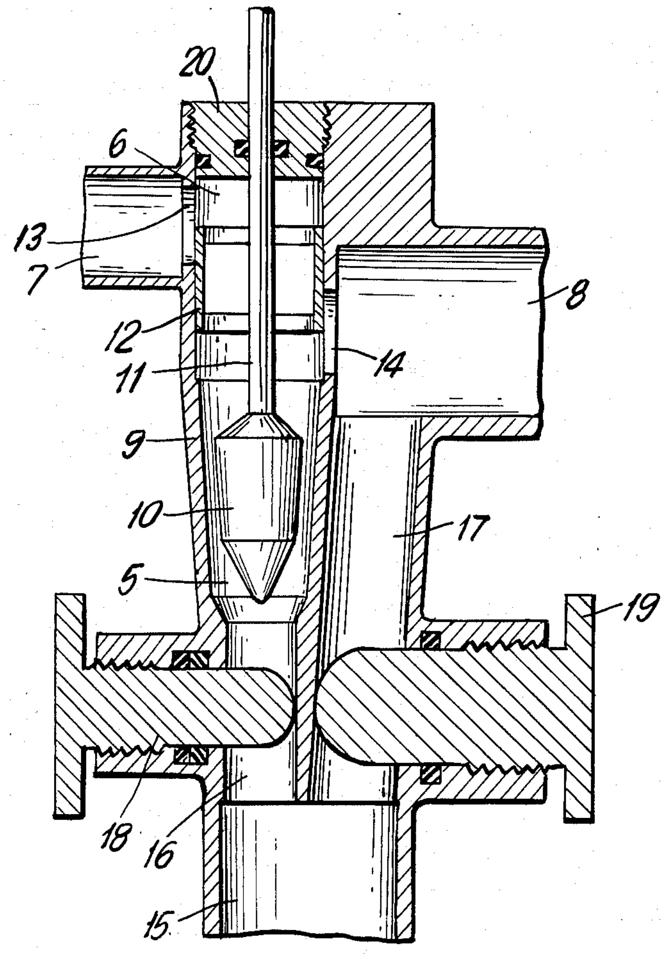
FIG. 2 illustrates a device according to the invention for carrying out the method and having a flow body in the form of a cylindrical cone.

The measuring channel 5 and flow regulator 6 in the device illustrated in FIG. 2 are accommodated in a common housing 9.

A flow body 10 moves back and forth in measuring channel 5. Flow body 10 is connected to a valve piston 12 by means of a rod 11. Associated with piston 12 are two constrictions 13 and 14. Constriction 13 communicates with the line 7 that the solids are returned through and constriction 14 with the line 8 that they leave the system through. The concentrated solids are supplied to housing 9 through an intake 15. From intake 15, one channel 16 leads into measuring channel 5 and another channel 17 into solids-removal line 8. A choke 18 is positioned in channel 16 and another choke 19 in channel 17. A removable plug 20 at the top of housing 9 makes it possible to interchange flow bodies 10 and pistons 12 to vary the control characteristic.

The liquid with the suspension of solids is introduced into centrifuge 1 through supply line 2. The clarified phase leaves the centrifuge through first outlet 3. The concentrated solids are removed from the centrifuge at a constant rate through what are called nozzles and diverted through second outlet 4. The concentration of diverted solids accordingly depends on the level of solids in the liquid supplied to the centrifuge through supply line 2 and on the throughput of the nozzles. If the concentration of solids is lower than desired, part of the solids emerging from the nozzles can be returned to centrifuge 1 through line 7 to increase the concentration. Decreasing the amount of solids returned to the centrifuge on the other hand will lower their concentration.

Chokes 18 and 19 initially divide the stream of solids flowing into housing 9 through intake 15 in such a way that the desired concentration will be attained. Valve piston 12 will simultaneously assume a midposition, which can easily be established by means of rod 11, which extends through plug 20. If the prescribed concentration of solids changes, the increased fluid friction that results from the increased viscosity will force flow body 10 up until an equilibrium is re-established between its weight and the forces that act on it due to the flow of liquid. Flow body 10 will, as it rises, also lift piston 12 by means of rod 11, reducing the cross-section of constriction 13 and expanding that of constriction 14. Thus, less solids will be returned to centrifuge 1 through line 7 and more solids diverted through line 8. The concentration of solids leaving centrifuge 1 through second outlet 4 will accordingly decrease and the original level be re-established. If, on the other hand, the viscosity of the solids decreases, the aforesaid procedure will reverse itself.

Figure 3:
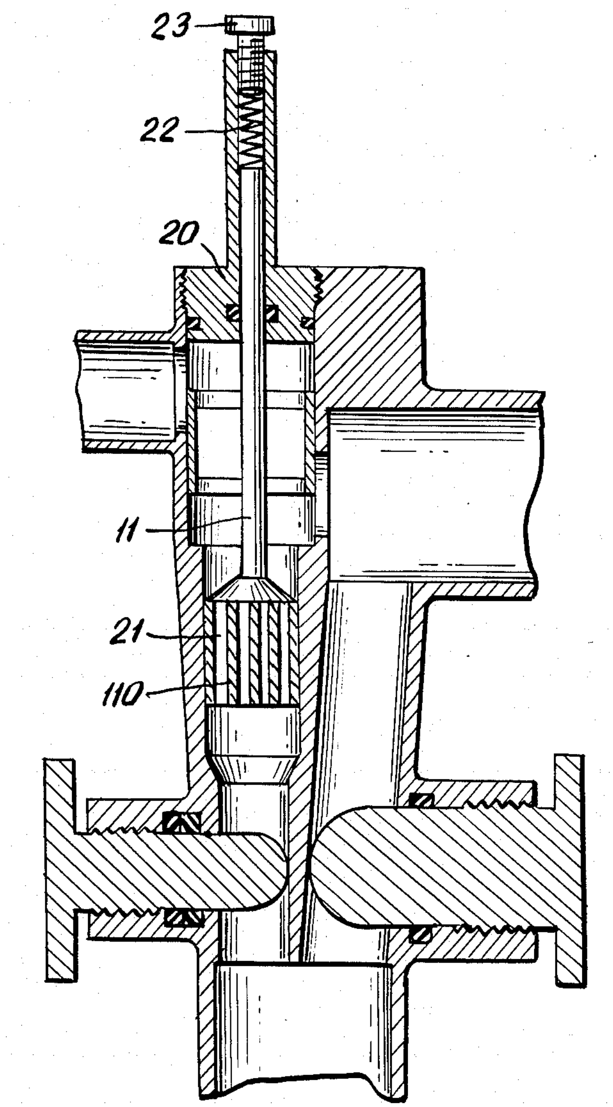
FIG. 3 illustrates a device according to the invention with a cylindrical flow body.

The flow body 110 illustrated in FIG. 3 is provided with channels 21. The concentrated solids flow through them. The fluid friction in channels 21 increases with the viscosity of the solids and increases the lift on flow body 110, which accordingly rises. The section of rod 11 that extends through plug 20 compresses a spring 22 until the forces regain equilibrium. The tension on spring 22 can be varied by means of a setscrew 23 to change the control characteristic.

Figure 4:
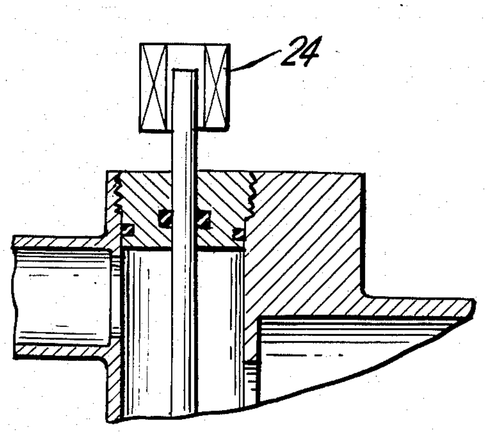
FIG. 4 is a section through part of a device according to the invention with an inductive sensor.
Figure 5:
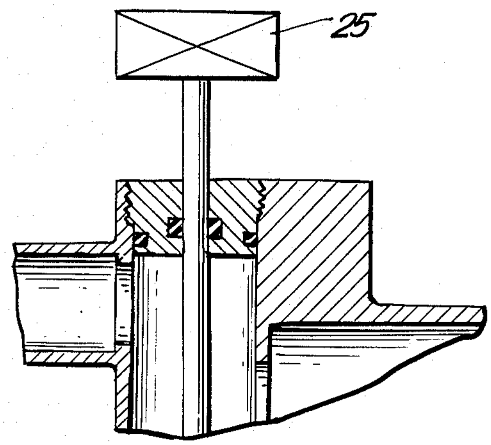
FIG. 5 is a section through part of a device according to the invention with a pressure sensor.

As will be evident from FIGS. 4 and 5, however, it is also possible to exploit the forces acting on flow body 10 or 110 to indirectly adjust a flow regulator. In this case there is no valve piston 12 in housing 9, and a flow regulator is accommodated in either line 7 or line 8. The control signal for adjusting the flow regulator is generated for example in an inductive stroke sensor 24 by the motion of rod 11 as illustrated in FIG. 4. A pressure sensor 25 like that illustrated in FIG. 5, however, can be employed instead, to convert the forces acting on flow body 10 or 110 into a measurement signal.

It will be appreciated that the instant specification and claims are set forth by way of illustration and not limitation, and the various modifications and changes may be made without departing from the spirit and scope of the present invention.

What is claimed is:

1. A device for regulating flow comprising: a flow channel; adjustable flow regulating means for controlling the flow of fluid containing solids from the channel including a valve piston; means for adjusting the flow regulating means as a function of the viscosity of the fluid in the channel comprising a flow-body disposed in the channel and configured to obtain an increase in the force exerted on it by solids in a fluid in response to an increase in the viscosity of the fluid and a rod downstream of the flow body and connecting the flow body to the valve piston, a common housing for the flow channel and the flow regulating means and having an intake and two outlets; wherein the flow regulating means further comprises means forming a first constriction between the flow channel and one outlet and a second constriction between the flow channel and the outlet and wherein the piston is configured to reduce the open cross-section of one of the first and second constrictions while increasing the open cross section of the other of the first and second constrictions in response to the movement of the piston by the flow body, a second channel extending from the intake to the first mentioned channel and a third channel extending from the intake to one outlet.

2. The device according to claim 1, wherein the channel is vertical, the flow body has a cylindrical conical shape and the channel has similar cylindrical conical shape, wherein the flow body is disposed in the channel to define a gap between the outside diameter of the flow body and the inside diameter of the channel which increases when the flow body moves in the direction of flow and which is opposite to the force of gravity.

3. The device according to claim 1, wherein the flow body and channel are cylindrical and the flow body is closely surrounded by the channel, and wherein the flow body has a plurality of axial channels.

4. The device as in claim 1, further comprising a spring biasing the flow body against the direction of flow.

5. The device as in claim 1, further comprising a set screw for adjusting the force exerted on the flow body by the spring.

6. The device as in claim 1, further comprising chokes positioned in the second and third channels.

* * * * *